United States Patent [19]

Nagano et al.

[11] Patent Number: 5,304,241
[45] Date of Patent: Apr. 19, 1994

[54] ELECTRONIC COMPONENT SEALING FILLER

[75] Inventors: Yoji Nagano; Takashi Ueno; Toshiaki Maeda, all of Tokyo, Japan

[73] Assignee: Toshiba Ceramics Co., Ltd., Tokyo, Japan

[21] Appl. No.: 896,843

[22] Filed: Jun. 12, 1992

[30] Foreign Application Priority Data

Jun. 28, 1991 [JP] Japan .................................. 3-185471

[51] Int. Cl.⁵ ............................................. C04B 14/04
[52] U.S. Cl. ................................ 106/482; 106/287.34; 106/481; 428/404
[58] Field of Search .................. 106/481, 482, 287.34; 428/404

[56] References Cited

U.S. PATENT DOCUMENTS

| | | | |
|---|---|---|---|
| 4,677,026 | 6/1987 | Hamamoto et al. | 106/481 |
| 4,792,358 | 12/1988 | Kimura et al. | 428/404 |
| 4,814,018 | 3/1989 | Tsurumaru et al. | 106/481 |
| 4,892,591 | 1/1990 | Ogawa et al. | 106/481 |
| 4,923,912 | 5/1990 | Sasaki et al. | 523/466 |

OTHER PUBLICATIONS

World Patent Index Latest: AN: 87-338567/48 zu J 62 24 36 30-A, Oct. 24, 1987 Inorganic filler for resin composition.

World Patent Index Latest: AN: 85-16 29 82/27 zu J 60 09 44 55-A, May 27, 1985 Polyepoxide Polyester Polyphenol Melamine Polyimide Silicone.

*Primary Examiner*—Mark L. Bell
*Assistant Examiner*—Willie J. Thompson
*Attorney, Agent, or Firm*—Finnegan, Henderson, Farabow, Garrett & Dunner

[57] ABSTRACT

A filler to be dispersed, as an inorganic material, in a thermosetting resin to produce an electronic component sealing agent, is composed of crystalline silicon dioxide particles. Not less than 70 wt-% of the crystalline silicon dioxide particles have the major-to-minor-axis ratio in the range of 1.20–1.40 and the circularity in the range of 0.75–0.90.

3 Claims, 2 Drawing Sheets

ELECTRONIC COMPONENT SEALING FILLER

BACKGROUND OF THE INVENTION

The present invention relates to a filler that is composed of silicon dioxide particles and constitutes a sealing agent to be used for sealing an electronic component such as a semiconductor device.

Conventional electronic component sealing fillers of the above kind are composed of crystalline silicon dioxide particles having a broken surface (i.e., a surface having acute-angled protrusions). When an electronic component sealing agent is produced by dispersing the conventional filler as an inorganic material in a thermosetting resin (e.g., epoxy resin), if the mixing proportion of the silicon dioxide particles is increased to reduce the stress that will be occur at the time of sealing an electronic component (e.g., semiconductor device), following problems will arise originating from the broken surface nature of the silicon dioxide particles: 1) increase of the melting viscosity of the electronic component sealing agent, which leads to 2) marked wear of molds, which then results in 3) a reduced efficiency of an electronic component sealing operation.

In order to reduce the melting viscosity of the electronic component sealing agent, it has conventionally been proposed to heat-melt the surface of the silicon dioxide particles for the electronic component sealing filler, for instance, by a plasma flame, to provide silicon dioxide particles having a surface that is curved relatively smoothly (i.e., a surface having obtuse-angled bulges). However, this technique is associated with the following problems: 4) the surface layer of the silicon dioxide particles becomes amorphous; and therefore 5) the heat conductivity becomes lower than the case of the crystalline silicon dioxide particles.

SUMMARY OF THE INVENTION

An object of the invention is provide an electronic component sealing filler which can provide a sealing agent having a proper melting viscosity and heat conductivity.

Another object is to provide an electronic component sealing filler with which an electronic component sealing operation can readily be performed, and with which a problem of mold wear can be avoided.

A filler to be dispersed, as an inorganic material, in a thermosetting resin to produce an electronic component sealing agent, is composed of crystalline silicon dioxide particles. Not less than 70 wt-% of the crystalline silicon dioxide particles have the major-to-minor-axis ratio in the range of 1.20–1.40 and the circularity in the range of 0.75–0.90.

DESCRIPTION OF THE PREFERRED EMBODIMENTS

An electronic component sealing filler according to the present invention is composed of crystalline silicon particles whose diameter is in the range of 0.1–200 μm (preferably 1–50 μm) and which has a surface that is curved relatively smoothly (i.e., a surface having obtuse-angled bulges).

The reason why the crystalline silicon dioxide particles are employed is to assure enough heat conductivity of the electronic component sealing agent that is produced by dispersing the silicon dioxide particles, as an inorganic material, in the thermosetting resin (e.g., an epoxy resin).

The reasons why the diameter of the silicon dioxide particles is restricted in the range of 0.1–200 μm are as follows: 1) if it is smaller than 0.1 μm, the manufacturing cost is undesirably increased to produce fine particles; and 2) it is larger than 200 μm, sufficient filling density cannot be assured in dispersing the particles in the thermosetting resin, which will reduce the mechanical strength of the electronic component sealing agent.

Further, the electronic component sealing filler of the invention has such features that not less than 70 wt-% of the constituent silicon dioxide particles have the major-to-minor-axis ratio (i.e., the ratio of the ellipse-equivalent major axis to the ellipse-equivalent minor axis) of 1.20–1.40 and the circularity of 0.75–0.90.

The reasons why not less than 70 wt-% of the silicon dioxide particles are made to have the major-to-minor-axis ratio of 1.20–1.40 are as follows: 1) the ratio smaller than 1.20 means that the particles assume a substantially spherical shape, and so they cannot be produced from a crystalline material; and 2) the ratio larger than 1.40 means that the particles substantially have a broken surface (i.e., a surface having acute-angled protrusions), and following problems will occur when the electronic component sealing agent is produced by dispersing the particles in the thermosetting resin: an increase of the melting viscosity of the electronic component sealing agent, which leads to marked wear of molds, which then results in a reduced efficiency of an electronic component sealing operation.

The reasons why not less than 70 wt-% of the silicon dioxide particles should have the circularity of 0.75–0.90 are as follows: 1) the circularity smaller than 0.75 means that the particles substantially have a broken surface (i.e., a surface having acute-angled protrusions), and following problems will occur when the electronic component sealing agent is produced by dispersing the particles in the thermosetting resin: an increase of the melting viscosity of the electronic component sealing agent, which leads to marked wear of molds, which then results in a reduced efficiency of an electronic component sealing operation; and 2) the circularity larger than 0.90 means that the particles assume a substantially spherical shape, and so they cannot be produced from a crystalline material.

Figure 1:
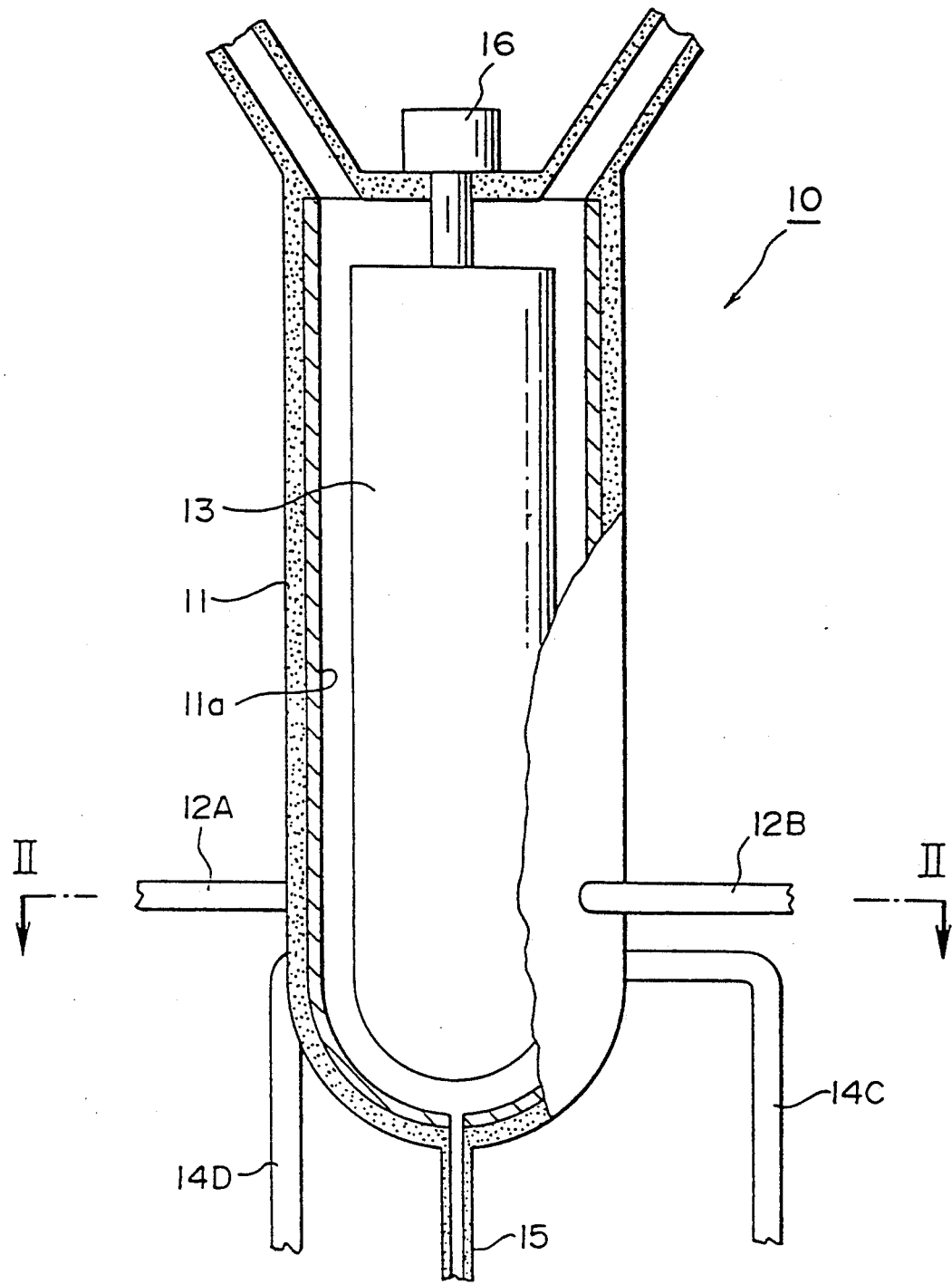
FIG. 1 is a vertical sectional taken along line I—I in FIG. 2 of a pulverizer for producing an electronic component sealing filler according to an embodiment of the invention.
Figure 2:
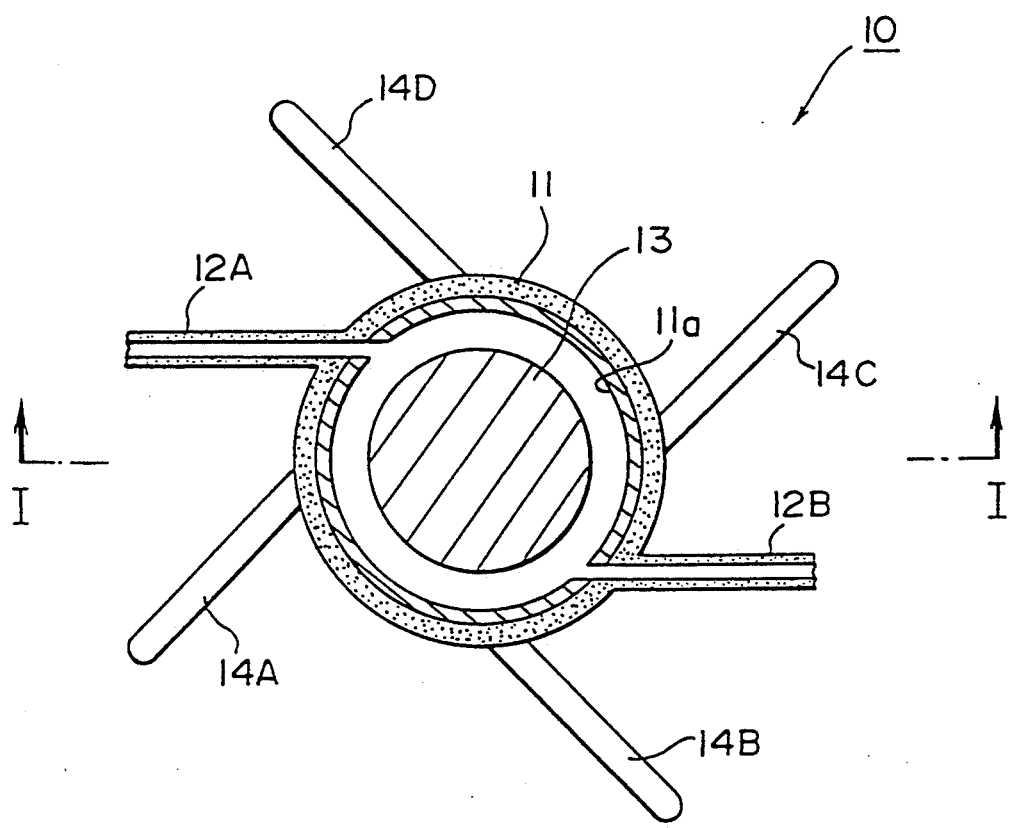
FIG. 2 is a horizontal sectional view taken along line II—II in FIG. 1.

Referring to FIGS. 1 and 2, there is described a manufacturing method of an electronic component sealing filler according to an embodiment of the invention.

First, natural silica or crystal is roughly crushed by an appropriate crusher (e.g., a jaw crusher or roll crusher), and then finely crushed by an appropriate pulverizer (e.g., a ball mill), to produce silicon dioxide particles as a starting material having a diameter not more than 500 μm and a broken surface (i.e. a surface having acute-angled protrusions).

After properly sorted out, the silicon dioxide particles having a broken surface are retained in a powder supplier (not shown), and provided into a pulverizer 10 together with a pressurized fluid (e.g., a dry gas such as air, a nitrogen gas, an oxygen gas or an argon gas) as a carrier gas via powder supplying nozzles 12A, 12B attached to the side face of an outer cylinder 11 that is a part of the pulverizer 10. In the inside of the pulverizer 10, the silicon dioxide particles having a broken surface collide with the outer surface of a semi-cylindrical ceramic rotor 13 along its tangential direction. Four fluid supplying nozzles 14A-14D are attached to the outer cylinder 11 at the positions below the powder supplying nozzles 12A, 12B, and another fluid supplying nozzle 15 is attached to the bottom of the outer cylinder 11.

In addition to colliding with the outer surface of the ceramic rotor 13, the silicon dioxide particles collide with each other in the inside of the pulverizer 10 (i.e., in a space between the inner surface of the outer cylinder 11 and the outer surface of the ceramic rotor 13), so that they are pulverized by friction. In order to assure a high friction crush efficiency, it is preferred that the silicon dioxide particles be provided from the power supplying nozzle 12A, 12B into the pulverizer 10 at the rate of not less than 0.5 Nm$^3$/min, and that the ceramic rotor 13 be rotated at the rotational speed of not less than 200 rpm by a drive means 16 disposed outside the top of the outer cylinder 11.

A longer ceramic rotor 13 is preferred to enable sufficient friction crush of the silicon dioxide particles. It is particularly preferred that the length of the ceramic rotor 13 be not less than 1,500 mm.

If the inner surface of the outer cylinder 11 and the outer surface of the ceramic rotor 13 wear due to the collision of the silicon dioxide particles, resultant wear debris will be mixed, as impurities, into the silicon dioxide particles. To prevent this problem, a ceramic layer 11a composed of proper ceramics (e.g., alumina and silicon carbide) having the new-Mohs-scale hardness of 8 or more is formed on the inner surface of the outer cylinder 11. The ceramic rotor 13 itself is composed of proper ceramics (e.g., alumina and silicon carbide) having the new-Mohs-scale hardness of 8 or more, or only its outer surface layer is composed of such ceramics.

The interval between the outer surface of the ceramics rotor 13 and the inner surface (i.e., ceramic layer 11a) is suitably determined in accordance with the average diameter of the silicon dioxide particles provided into the pulverizer 10. For example, where the average diameter of the silicon dioxide particles is in the range of 1–50 μm, it is preferred that the interval be set at about 10 mm.

To improve the crush efficiency, it is desirable that the silicon dioxide particles having a broken surface (i.e., a surface having acute-angled protrusions) be sorted out to provide particles having a diameter in a desired range that are to be supplied into the pulverizer 10.

The silicon dioxide particles having a broken surface are pulverized in the pulverizer 10 until their major-to-minor-axis ratio (i.e., the ratio of the ellipse-equivalent major axis to the ellipse-equivalent minor axis) becomes within the range of 1.20–1.40 and their circularity within the range of 0.75–0.90. The silicon dioxide particles which have been pulverized in such a manner are then collected from the top of the pulverizer 10 by an appropriate collecting means (not shown) such as a cyclone, and then finally sorted out.

To facilitate the understanding of the electronic component sealing filler of the invention, specific examples are described which include particular numerical values. In these examples, natural silica was roughly crushed by a jaw crusher, and then finely pulverized by a ball mill to produce silicon dioxide particles having a broken surface (i.e., a surface having acute-angled protrusions) as a starting material. A pulverizer as explained above was used (see FIGS. 1 and 2.

While the silicon dioxide particles having the average diameter of 20 μm were provided, as the starting material, into the powder supplier at the rate of 3.0 kg/hour, they were provided from the powder supplier into the pulverizer together with dry air pressurized to 7.0 kg/cm$^2$ via the two powder supplying nozzles attached to the side face of the pulverizer. The flow rate of the dry air in the two powder supplying nozzles was 0.5 Nm$^3$/min, and that of the dry air in the four fluid supplying nozzles attached to the side face of the pulverizer was 0.1 Nm$^3$/min. Further, the flow rate of the dry air in the other fluid supplying nozzle attached to the bottom of the pulverizer was 0.1 Nm$^3$/min.

The ceramic rotor disposed inside the pulverizer was a one having a semi-cylindrical shape of 500 mm in diameter and 2,000 mm in length, composed of alumina ceramics, and having the maximum surface roughness of 5 μm. The ceramics rotor was rotated at 500 rpm. The inner surface layer of the outer cylinder of the pulverizer was also made of alumina ceramics, and is spaced from the outer surface of the ceramics rotor by 10 mm.

The silicon dioxide particles were pulverized until their diameter becomes within an appropriate range, and then sequentially collected from the top of the pulverizer by a cyclone. The pulverizing operation was continuously performed in the pulverizer.

Measurement results were as shown in Tables 1 and 2.

TABLE 1

| | Proportion of existence | Major-to-minor-axis ratio | Circularity | Specific surface (M$^2$/g) | Melting viscosity (poise) |
|---|---|---|---|---|---|
| Example | | | | | |
| 1 | 80 | 1.36 | 0.79 | 2.85 | 270 |
| 2 | 80 | 1.30 | 0.85 | 2.88 | 235 |
| 3 | 80 | 1.21 | 0.88 | 2.95 | 220 |
| 4 | 70 | 1.30 | 0.85 | 2.86 | 245 |
| Referential example | | | | | |
| 1 | 60 | 1.30 | 0.85 | 2.80 | 320 |
| 2 | 80 | 1.50 | 0.70 | 2.75 | 370 |
| 3 | 80 | 1.30 | 0.85 | 2.88 | 235 |

TABLE 2

| | Flexural elasticity modulus (kg/mm$^2$) | Thermal expansion coeff. $a$ (1/°C.) | Thermal stress $E \cdot a$ | Heat conductivity (cal/cm · sec · °C.) |
|---|---|---|---|---|
| Example | | | | |
| 1 | 1570 | $2.5 \times 10^{-5}$ | $3.93 \times 10^{-2}$ | $3.5 \times 10^{-3}$ |
| 2 | 1580 | $2.5 \times 10^{-5}$ | $3.95 \times 10^{-2}$ | $3.5 \times 10^{-3}$ |
| 3 | 1600 | $2.5 \times 10^{-5}$ | $4.00 \times 10^{-2}$ | $3.5 \times 10^{-3}$ |
| 4 | 1580 | $2.5 \times 10^{-5}$ | $3.95 \times 10^{-2}$ | $3.5 \times 10^{-3}$ |
| Referential example | | | | |
| 1 | 1570 | $2.5 \times 10^{-5}$ | $3.93 \times 10^{-2}$ | $3.5 \times 10^{-3}$ |
| 2 | 1570 | $2.5 \times 10^{-5}$ | $3.93 \times 10^{-2}$ | $3.5 \times 10^{-3}$ |
| 3 | 1580 | $1.5 \times 10^{-5}$ | $2.37 \times 10^{-2}$ | $1.5 \times 10^{-3}$ |

The major-to-minor-axis ratio and circularity of the silicon dioxide particles as collected by the cyclone were measured with the results as shown in Table 1 which also shows the proportion of existence. Their specific surface was measured with a BET specific surface measuring device.

The characteristics of the melting viscosity, flexural elasticity modulus, thermal expansion coefficient, thermal stress and heat conductivity of electronic component sealing agents, that were experimentally produced for the purpose of examining the characteristics of electronic component sealing fillers, were measured in the following manner.

First, the silicon dioxide particles (i.e., electronic component sealing filler) were input to a roll together with an epoxy resin and a phenol resin and mulled therein to produce a mulled material. The mixing proportion in volume-% of the silicon dioxide particles, epoxy resin and phenol resin was 70:20:10.

The mulled material was crushed until it is rendered into tablets having a diameter in the range of 1-2 mm. The melting viscosity of the tablets was measured. On the other hand, specimens having the size of 10 mm×10 mm×80 mm were prepared from the mulled material, and subjected to measurements of the flexural elasticity modulus, thermal expansion coefficient and thermal stress. Cylindrical specimens of 50 mm in diameter and 10 mm in thickness were also prepared, and subjected to the heat conductivity measurement by a probe method. More specifically, a probe was contacted with a reference material having a known heat conductivity. A heater was attached to a surface of the reference material to which the specimen is to be attached. The heat conductivity of the specimen was measured by detecting its temperature variation while a constant power is applied externally to the heater. Results were as shown in Table 2.

The melting viscosity was measured using a flow testing device (what is called a "flow tester"). In the flow testing device, while tablets as specimens were charged in a cylinder and kept at 175° by heating the cylinder from around it, the tablets were pressurized to a predetermined pressure by a piston. The specimens, i.e., tablets were melted inside the cylinder, and pushed out from it and taken out through a small diameter die hole that is connected to the cylinder. The melting viscosity was calculated from the moving speed of the piston at that time. Measurement results were as shown in Table 1.

On the other hand, in order to prepare specimens of the referential examples 1 and 2 of Tables 1 and 2, silicon dioxide particles of the average diameter 20 μm were input to a roll together with an epoxy resin and a phenol resin without having been subjected to the pulverizing operation described above (i.e., the process performed on the specimens of the examples 1-4 of the invention), and mulled therein to produce a mulled material. The mulled material was then processed in the same manner as the specimens of the examples 1-4 of the invention, and subjected to measurements of the melting viscosity, flexural elasticity modulus, thermal expansion coefficient, thermal stress and heat conductivity.

With regard to the referential example 3, silicon dioxide particles of the average diameter 20 μm were subjected to a melting operation for 10 minutes by a plasma flame that is produced using an argon gas and an oxygen gas, while being supplied at the rate of 20 g/min. The flow rates of the argon gas and the oxygen gas were 50 l/min and 5 l/min, respectively. The power consumption of the plasma flame was 25 kW.

After subjected to the melting operation, the silicon dioxide particles were subjected to measurements of the major-to-minor-axis ratio, circularity and specific surface in the same manner as in the case of the examples 1-4 of the invention. It is noted that the observation with a polarizing microscope revealed that about 50% of the silicon dioxide particles had an amorphous surface layer of a thickness of 1-2 μm. The remaining about 50% of the particles were rendered into an amorphous state to its core.

The silicon dioxide particles having been subjected to the melting operation were also input to a roll together with an epoxy resin and a phenol resin, and mulled therein to produce a mulled material, which was then processed in the same manner as in the case of the examples 1-4 of the invention and subjected to measurements of the melting viscosity, flexural elasticity modulus, thermal expansion coefficient, thermal stress and heat conductivity.

It is apparent from the comparison between the examples 1-4 of the invention and the referential examples 1-3 that as long as not less than 70 wt-% of the silicon dioxide particles have the major-to-minor-axis ratio in the range of 1.20-1.40 and the circularity in the range of 0.75-0.90, the melting viscosity can be substantially low and the heat conductivity after the setting can be substantially high.

As described in the foregoing, the invention can provide the following advantages:

1) the melting viscosity of electronic component sealing agents can be reduced;

2) the flowability, operational easiness and heat conductivity of electronic component sealing agents can be improved; and 3) the wear of the molds can be suppressed.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment is chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A filler to be dispersed, as an inorganic material, in a thermosetting resin to produce an electronic component sealing agent, wherein the filler comprises crystalline silicon dioxide particles, and not less than 70 wt-% of the crystalline silicon dioxide particles have a major-to-minor-axis ratio in a range of 1.20-1.40 and a circularity in a range of 0.75-0.90.

2. The filler of claim 1, wherein the crystalline silicon dioxide particles have a diameter substantially in a range of 0.1-200 μm.

3. The filler of claim 2, wherein the diameter is substantially in a range of 1-50 μm.

* * * * *